Dec. 9, 1947.  J. H. NASH ET AL  2,432,119
TOY AIRCRAFT FLIGHT CONTROL DEVICE
Filed Feb. 12, 1946
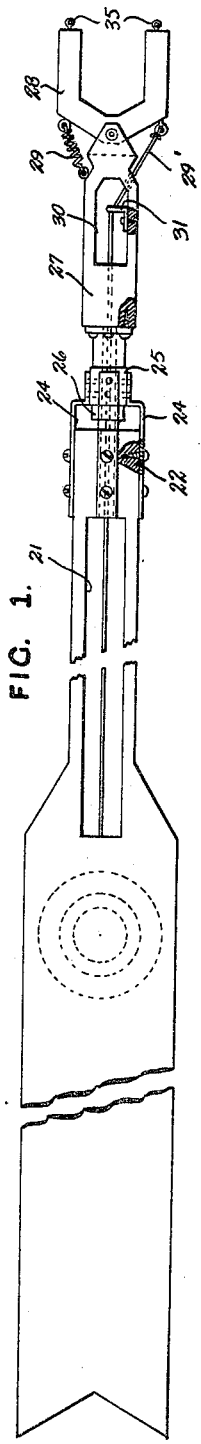
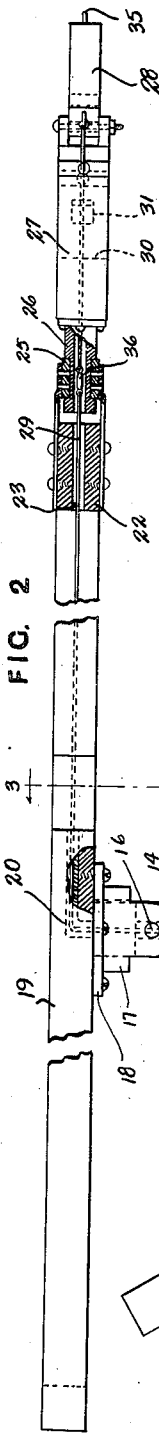
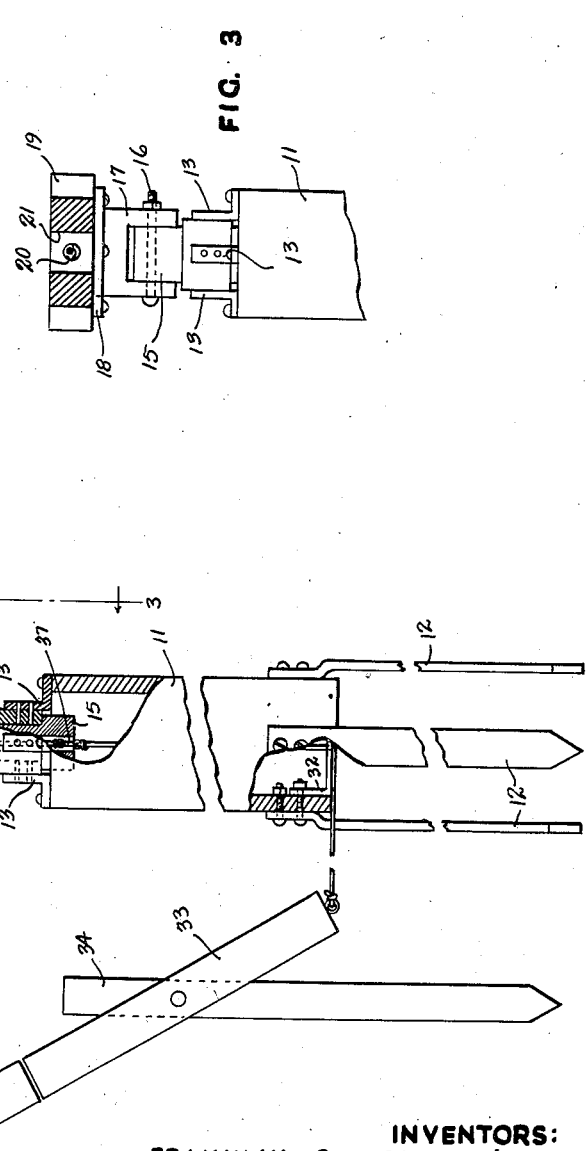
INVENTORS:
FRANKLIN C. MORRIS, &
JAMES H. NASH,
BY
ATTORNEYS.

Patented Dec. 9, 1947

2,432,119

UNITED STATES PATENT OFFICE 2,432,119

TOY AIRCRAFT FLIGHT CONTROL DEVICE

James H. Nash, Detroit, and Franklin C. Morris, Ferndale, Mich.

Application February 12, 1946, Serial No. 647,108

6 Claims. (Cl. 272—31)

This invention relates to flight control structures for miniature aircraft, and more particularly to a device for guiding a model airplane through a predetermined circle of flight from a position outside said circle.

A main object of the invention is to provide a novel and improved control device for miniature aircraft which is very simple in construction, economical to manufacture and easy to use, said device providing a means of controlling the movement of the aircraft so that it may perform many different flying operations simulating the maneuvers of full size aircraft.

A further object of the invention is to provide an improved control device for model aircraft wherein the aircraft is secured for circular flight around a stationary pivot post, the securing means for the aircraft being formed and arranged so that the aircraft may move up or down in its circular path and may be caused to perform various maneuvers during its flight by manipulation of the control device, the manipulated mechanism being outside the circle of flight of the aircraft whereby the operator may conveniently observe all movements thereof without turning around to follow its flight.

Further objects and advantages of the invention will become apparent from the following description and claims, and from the accompanying drawing, wherein:

Figure 1 is a top plan view, partly in cross section of a control device constructed in accordance with the present invention.

Figure 2 is a side elevational view, partly in cross-section, of the control device of Figure 1.

Figure 3 is a detail cross-sectional view taken on line 3—3 of Figure 2.

Referring to the drawing, 11 designates a hollow post member which, by way of example, may be rectangular in cross-sectional shape. Secured to the lower end of post member 11 are a plurality of downwardly directed stake members 12 which are pointed at their lower ends and are adapted to be driven into the ground to support post member 11 in vertical position. Secured to the top end of post member 11 are a plurality of inwardly facing angle brackets 13 to which is secured a bearing sleeve 14 thus supported by the brackets with its axis centered with respect to the central vertical axis of post member 11. Rotatably supported in bearing sleeve 14 for rotation around the vertical axis of the post member is a hollow bearing member 15. Straddling the top end of bearing member 15 and pivotally secured thereto by a bolt 16 for rotation around a horizontal axis is a bifurcated hollow support member 17. Support member 17 is formed with a top flange 18 to which is secured a counterbalanced elongated beam member 19 which may be shaped in the form of an arrow or any other desired shape. Beam member 19 is formed with a longitudinal bore 20 communicating with the hollow center of support member 17. The intermediate portion of beam member 19 is formed with an elongated longitudinal slot 21 and integral with the end portion of the beam member is a fixed bearing sleeve 22 having a bore 23 located in registry with the central longitudinal axis of the beam member. Secured to the end of beam member 19 by a plurality of brackets 24 is an additional bearing sleeve 25 in which is rotatably mounted a hollow bearing member 26 for rotation around the longitudinal axis of the beam member, said bearing member 26 carrying rigidly secured thereto a hollow support member 27 to the end of which is pivotally secured a U-shaped member 28, said U-shaped member being thus rotatable through a substantial angle around an axis normal to the plane of beam member 19. A spring 29 secures a side portion of U-shaped member 28 to support member 27 to thereby bias the U-shaped member to a laterally angled position, with respect to the longitudinal axis of the beam member. To the other side portion of U-shaped member 28 is secured a flexible cable 29' which may be a heavy fishing line. The intermediate portion of support member 27 is formed with an elongated opening 30 in which is mounted an apertured guide bracket 31. Cable 29' extends through bracket 31, support member 27, bearing member 26, bearing sleeve 23, slot 21, bore 20, support member 17, vertical bearing member 15 and post member 11 to the base of the post member. Secured inside the post member at the base thereof is an apertured guide bracket member 32 through which cable 29' passes and thence the cable member extends through a notch in the bottom edge of a side wall of the post member outwardly a substantial distance to a control lever 33 which is pivotally secured to a supporting stake 34 adapted to be driven into the ground.

The model airplane is secured to U-shaped member 28 by suitable light flexible cables, said U-shaped member being provided with eye lugs 35, 35 at the ends of its arms to which the cables are secured. During flight the airplane moves in a circular path around post member 11 and its vertical movements may be controlled by manipulating lever 33 whereby U-shaped member 28 is rotated by cable 29'. This relative rotation is communicated to the airplane by its connecting cables, and the airplane may be thus caused to perform various maneuvers during its flight. By providing a sufficient length of control cable 29', control lever 33 may be located outside the circle of flight of the airplane whereby all movements of the plane may be observed by the operator without turning to follow the flight of the plane.

To avoid excessive twisting of control cable 29' in the rotatable bearing members 26 and 15 which might otherwise be caused by looping the airplane, short wire swivel sections 36 and 37 are interposed in cable 29' in the respective bearing members. These wire sections are formed with loops at each end to which the ends of the cable are tied.

The powered model is attached by means of two strings to the arms of the U-shaped member 28. The cable 29' passes from the post member 11 either along the surface of the ground or under the ground to the control lever 33. The stake 34 is, of course, stationary, as is the post member 11. The control lever 33 is outside the circular path taken by the model airplane. The operator merely manipulates the control lever 33 while the model aircraft is in flight, and the motion of the control lever 33 will be communicated by means of the cable 29' to the U-shaped member 28. Tension of the cable 29' on the U-shaped member 28 will be opposed by the spring 29. Consequently, the lever 33 will control the position of the U-shaped member 28 about its vertical axis. The beam member 19 will, of course, turn on its vertical pivot to follow the line of flight of the model. The model may be attached at its fuselage, its wings, its nose, or its tail, in such a way that manipulation of the control lever 33 will cause the model to take different paths of flight. All this is accomplished while the operator is outside the path of flight.

While a specific embodiment of a flight control device for model aircraft has been disclosed in the foregoing description it will be understood that various modifications within the spirit of the invention may occur to those skilled in the art. Therefore it is intended that no limitations be placed on the invention other than as defined by the scope of the appended claims.

What is claimed is:

1. A control device for model aircraft comprising a hollow vertical post member, a beam member pivotally secured to the top end of said post member for rotation around a vertical axis, a longitudinal bore in said beam member, a U-shaped member pivotally secured to the end of said beam member, a spring connecting one side of said U-shaped member to said beam member, means for securing a model airplane to the ends of the arms of said U-shaped member, a cable connected to the other side of said U-shaped member, said cable passing through said bore and said hollow vertical post, and a control lever secured to the end of the cable, said control lever being positioned a substantial distance from the vertical post member.

2. The structure of claim 1, and wherein said control lever is positioned outside the circle of flight of the model airplane.

3. The structure of claim 1, and wherein said beam member is adapted to pivot around a horizontal axis as well as around a vertical axis with respect to said vertical post member.

4. A control device for model aircraft comprising a hollow vertical post member, a counterweighted beam member pivotally secured to the top end of said post member, said beam member being adapted to pivot around a horizontal axis and a vertical axis with respect to said vertical post member, a longitudinal bore in said beam member, a U-shaped member pivotally secured to the end of said beam member, said U-shaped member being adapted to pivot around the longitudinal axis of said beam member and around an axis normal to said longitudinal axis, a spring connecting one side of said U-shaped member to said beam member, means for securing a model airplane to the ends of the arms of said U-shaped member, a cable connected to the other side of said U-shaped member, said cable passing through said bore and said hollow vertical post, and a control lever secured to the end of the cable.

5. The structure of claim 4, and wherein said control lever is positioned outside the circle of flight of the model airplane.

6. The structure of claim 4, and wherein said vertical post member is provided with a plurality of downwardly directed sharpened stake members rigidly secured to the bottom end of the post member, said stake members being driven into the ground.

JAMES H. NASH.
FRANKLIN C. MORRIS.